US012760205B2

(12) United States Patent
Noh et al.

(10) Patent No.: US 12,760,205 B2
(45) Date of Patent: Oct. 13, 2026

(54) ELECTRICALLY CONDUCTIVE ADHESIVE FILM

(71) Applicant: 3M INNOVATIVE PROPERTIES COMPANY, St. Paul, MN (US)

(72) Inventors: Taehoon Noh, Suwon (KR); Jeongwan Choi, Suwon-Si (KR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 738 days.

(21) Appl. No.: 18/005,686

(22) PCT Filed: Jun. 16, 2021

(86) PCT No.: PCT/IB2021/055335
§ 371 (c)(1),
(2) Date: Jan. 17, 2023

(87) PCT Pub. No.: WO2022/023830
PCT Pub. Date: Feb. 3, 2022

(65) Prior Publication Data

US 2023/0287248 A1 Sep. 14, 2023

Related U.S. Application Data

(60) Provisional application No. 63/057,988, filed on Jul. 29, 2020.

(51) Int. Cl.
*C09J 7/38* (2018.01)
*C08K 3/08* (2006.01)
(Continued)

(52) U.S. Cl.
CPC ................ *C09J 7/385* (2018.01); *C08K 7/16* (2013.01); *C08K 9/12* (2013.01); *C09J 7/10* (2018.01);
(Continued)

(58) Field of Classification Search
CPC ......... C08K 2201/001; C08K 2201/003; C09J 9/02; C09J 2301/408
See application file for complete search history.

(56) References Cited

U.S. PATENT DOCUMENTS 8,975,004 B2 3/2015 Choi et al.
9,336,923 B2 5/2016 Choi et al.
(Continued)

FOREIGN PATENT DOCUMENTS

JP 05279644 A 10/1993
JP 2020043199 A * 3/2020
(Continued)

OTHER PUBLICATIONS

Machine translation of WO-2014003159-A1 obtained from DAV PE2E (Year: 2014).*
(Continued)

*Primary Examiner* — Kregg T Brooks
*Assistant Examiner* — David R. Foss
(74) *Attorney, Agent, or Firm* — Clifton F. Richardson; Theresa Stadheim

(57) ABSTRACT

An electrically conductive adhesive film includes an adhesive layer having opposing first and second major surfaces spaced apart a distance T in a thickness direction of the adhesive layer, where T≥20 microns, and a plurality of electrically conductive particles dispersed in the adhesive layer between the first and second major surfaces. For at least 90% of the electrically conductive particles in the plurality of electrically conductive particles, the electrically conductive particles have a particle diameter D50 greater thank T/4 and a maximum size of the electrically conductive particles is less than T.

19 Claims, 6 Drawing Sheets

(51) Int. Cl.
*C08K 7/16* (2006.01)
*C08K 9/12* (2006.01)
*C09J 7/10* (2018.01)
*C09J 9/02* (2006.01)

(52) U.S. Cl.
CPC ......... *C09J 9/02* (2013.01); *C08K 2003/0862* (2013.01); *C08K 2201/001* (2013.01); *C08K 2201/003* (2013.01); *C09J 2301/408* (2020.08); *C09J 2433/00* (2013.01)

(56) References Cited

U.S. PATENT DOCUMENTS

| | | | | |
|---|---|---|---|---|
| 9,336,934 | B2 | 5/2016 | Kim et al. | |
| 2002/0113871 | A1* | 8/2002 | Sakamaki ................ | G03G 9/12 348/106 |
| 2008/0149901 | A1 | 6/2008 | Choi et al. | |
| 2009/0288697 | A1 | 11/2009 | Shimizu et al. | |
| 2009/0311502 | A1 | 12/2009 | Mccutcheon et al. | |
| 2010/0147355 | A1 | 6/2010 | Shimizu et al. | |
| 2018/0002575 | A1 | 1/2018 | Sato et al. | |

FOREIGN PATENT DOCUMENTS

| | | | |
|---|---|---|---|
| WO | 2008014169 | A1 | 1/2008 |
| WO | 2014003159 | A1 | 1/2014 |

OTHER PUBLICATIONS

Machine translation of JP-2020043199-A obtained from IP.com (Year: 2020).*
International Search Report for PCT International Application No. PCT/IB2021/055335, malled on Aug. 24, 2021, 4 pages.

* cited by examiner

ELECTRICALLY CONDUCTIVE ADHESIVE FILM

CROSS REFERENCE TO RELATED APPLICATIONS

This application is a national stage filing under 35 U.S.C. 371 of PCT/IB2021/055335, filed Jun. 16, 2021, which claims the benefit of U.S. Application No. 63/057,988, filed Jul. 29, 2020, the disclosures of which are incorporated by reference in their entirety herein.

BACKGROUND

Electrically conductive adhesives can include electrically conductive particles dispersed in an adhesive layer.

SUMMARY

The present disclosure relates generally to electrically conductive adhesive films.

In some aspects of the present disclosure, an electrically conductive adhesive film including an adhesive layer and a plurality of electrically conductive particles dispersed in the adhesive layer is provided. A median particle diameter of the plurality of electrically conductive particles, or of at least 90% of the electrically conductive particles, can be greater than ¼ of a thickness of the adhesive layer.

In some aspects of the present disclosure, an electrically conductive adhesive film including an adhesive layer and a plurality of electrically conductive particles is provided. The adhesive layer has opposing first and second major surfaces spaced apart a distance T in a thickness direction of the adhesive layer where T≥20 microns. The plurality of electrically conductive particles is dispersed in the adhesive layer between the first and second major surfaces. For at least 90% of the electrically conductive particles in the plurality of electrically conductive particles, the electrically conductive particles have a particle diameter D50 greater than T/4 and a maximum size of the electrically conductive particles is less than T.

In some aspects of the present disclosure, an electrically conductive adhesive film including an adhesive layer and a plurality of electrically conductive particles is provided. The adhesive layer has opposing first and second major surfaces spaced apart a distance T in a thickness direction of the adhesive layer where T≥20 microns. The plurality of electrically conductive particles is dispersed in the adhesive layer between the first and second major surfaces and has particle diameters D10, D50 and D90. D50 is greater than T/4, D90 is less than 0.9 T, and D90/D10 is less than 3.5. For each particle in at least a majority of the electrically conductive particles, an outermost surface of the particle fits between concentric larger and smaller spheres, the larger sphere having a diameter of no more than about 4 times a diameter of the smaller sphere.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Conventional electrically conductive adhesives utilizing electrically conductive particles have utilized particles with a particle diameter D50 much smaller than a thickness of the adhesive layer. According to some embodiments of the present description, it has been found that when the particle diameter D50 is increased to a substantial portion of the thickness (e.g., D50 greater than about ¼ the thickness) of the adhesive layer, while the largest particle size is still less than the thickness of the adhesive layer, that conductance in the thickness direction is increased. Further, according to some embodiments, it has been found that the film exhibits less resistance increase over time (e.g., under high temperature and/or high humidity conditions) compared to conventional electrically conductive adhesives.

Figure 1:
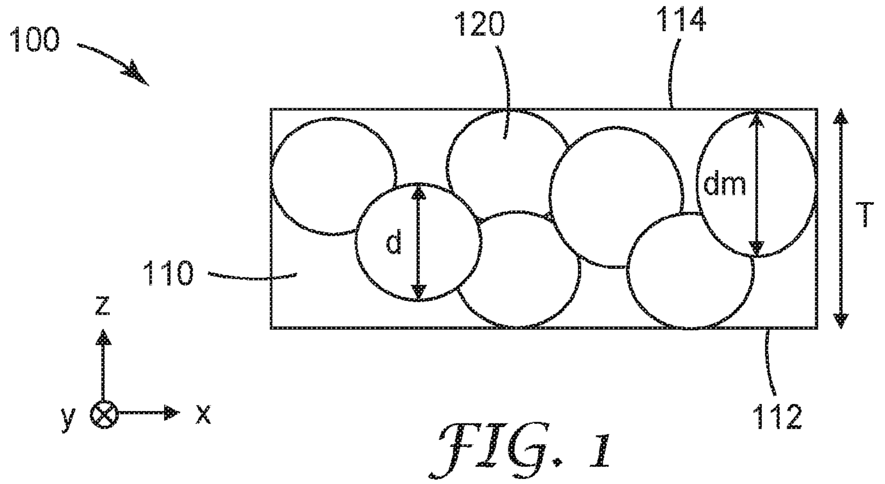
FIG. 1 is a schematic side cutaway view of an illustrative electrically conductive adhesive film.

FIG. 1 is a schematic side cutaway view of an electrically conductive adhesive film 100, according to some embodiments. The film 100 includes an adhesive layer 110 including opposing first and second major surfaces 112 and 114 spaced apart a distance T in a thickness direction (z-direction referring to the illustrated x-y-z coordinate system) of the adhesive layer 110. In some embodiments, T≥20 microns, or T≥50 microns, or T≥100 microns, or T≥150 microns, or T≥200 microns. The distance T be can be up to about 2 mm or up to about 1 mm, for example. In some embodiments, the distance T is in a range of about 50 microns to about 2 mm, or about 100 microns to about 1 mm, for example. The film 100 includes a plurality of electrically conductive particles 120 dispersed in the adhesive layer 110 between the first and second major surfaces 112 and 114. In some embodiments, for at least 90% of the electrically conductive particles in the plurality of electrically conductive particles 120, the electrically conductive particles have a particle diameter D50 greater than T/4 and a maximum size of the electrically conductive particles is less than T. The particle diameter D50 may be referred to as a median particle diameter and may be determined by a laser diffraction particle size analyzer, for example. The illustrated particle diameter d may be equal to the particle diameter D50, for example, and the illustrated particle size dm may be the maximum size of the particles in the plurality of electrically conductive particles 120 or in the at least 90% of the electrically conductive particles.

As described further elsewhere, D10, D50 and D90 values (also referred to as Dv10, Dv50 and Dv90 values) can be defined for a plurality of particles such that particles in the plurality particles having diameters of no more than D10, D50 and D90 provide 10%, 50% and 90%, respectively, of a total volume of the particles. Particle diameter can be understood to be the equivalent diameter (diameter of a sphere having the same volume as the particle) in the case of non-spherical particles, unless indicated differently. The plurality of particles can be the entire plurality of electrically conductive particles 120 or a subset of the plurality of electrically conductive particles 120. For example, D10, D50 and D90 values can be determined for the plurality of electrically conductive particles 120 and/or for at least 90% (by number) of the electrically conductive particles in the plurality of electrically conductive particles 120. Similarly, other properties characterizing the particle size distribution may be specified from the entire plurality of the particles and/or for a subset (e.g., at least 90%) of the plurality of particles. The at least 90% of the electrically conductive particles 120 may exclude the 10% by number of the electrically conductive particles 120 having the largest volume or largest size, for example, or may exclude the 10% by number of the electrically conductive particles 120 having the smallest volume, for example. Properties (e.g., D10, D50 and D90) of the at least 90% of the electrically conductive particles in the plurality of electrically conductive particles 120 can be determined from a particle size distribution function of the plurality of electrically conductive particles 120 which can be determined via laser diffraction (e.g., using a laser diffraction particle size analyzer), for example.

Larger particle diameters (e.g., D50>T/4) relative to the thickness of the adhesive layer has been found to provide improved electrical conductance compared to films with smaller particles. In some embodiments, for the at least 90% of the electrically conductive particles in the plurality of electrically conductive particles 120, the electrically conductive particles have a particle diameter D50 greater than T/4, or greater than T/3, or greater than T/2. In some such embodiments, or in other embodiments, for the at least 90% of the electrically conductive particles in the plurality of electrically conductive particles 120, the electrically conductive particles have a particle diameter D50 less than 0.9 T, or less than 0.8 T, or less than 0.7 T. In some embodiments, the plurality of electrically conductive particles 120 has a particle diameter D50 greater than T/4, or greater than T/3, or greater than T/2. In some such embodiments, or in other embodiments, the plurality of electrically conductive particles 120 has a particle diameter D50 less than 0.9 T, or less than 0.8 T, or less than 0.7 T.

The maximum particle size of a particle is the maximum dimension of the particle (e.g., a diagonal dimension of a rectangular particle, or a major axis of an ellipsoid, or a diameter of a sphere). The maximum particle size of a plurality of particles is the largest of the maximum dimension of any of the particles in the plurality of particles. In some embodiments, for the at least 90% of the electrically conductive particles in the plurality of electrically conductive particles 120, the electrically conductive particles have a maximum size of less than T, or less than 0.9 T, or less than 0.8 T, or less than 0.7 T. In some embodiments, the particles of the plurality of electrically conductive particles 120 have a maximum size of less than T, or less than 0.9 T, or less than 0.8 T, or less than 0.7 T.

Particle diameters can be characterized in terms of particle size distribution functions. A cumulative particle size distribution function V(S) can be defined such that V(S) is the fraction (or percent) of the total volume of the particles provided by particles having a diameter no more than S, where the particle diameter is the equivalent diameter (diameter of a sphere having the same volume as the particle) in the case of non-spherical particles. A particle size distribution f(S) can be defined such that an area under a plot of f(S) versus particle diameter between two different particle diameters is proportional to the fraction (or percent) of the total volume of the particles provided by particles having diameters between the two different particle diameters. The distribution function distribution f(S) is normalized so that the cumulative distribution function V(S) approaches 1 or 100% for large particle diameters. f(S) can be determined from laser diffraction techniques, for example, as is known in the art.

Figure 2:
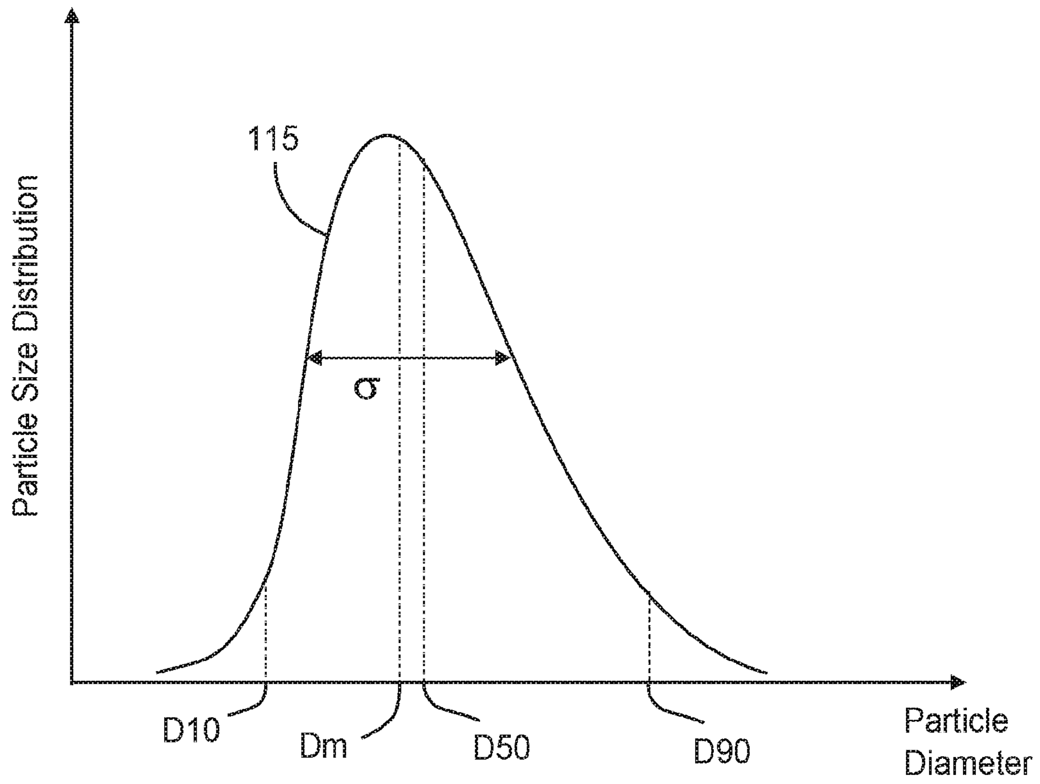
FIG. 2 is schematic plot of an illustrative particle size distribution.

FIG. 2 is schematic plot of an illustrative particle size distribution 115. The particles have a mean diameter Dm, which can be understood to be the volume-weighted arithmetic mean particle diameter, unless indicated differently. The particle size distribution can be characterized by DX (also referred to as DvX) values where X is the percent of the total volume of the particles provided by particles having a size of no more than the DX value. For example, particles having a size of D10 or less provide 10% of the total volume of the particles. Similarly, particles having a size of D50 or less provide 50% of the total volume of the particles, and particles having a size of D90 or less provide 90% of the total volume of the particles. DX (e.g., D10, D50, D90) values can be understood to be those values determined by laser diffraction particle size analysis, unless specified differently. For example, an LS 13 320 laser Diffraction Particle Size Analyzer (available from Beckman Coulter, Inc., Brea CA) can be used to determine the DX values. The particle size distribution 115 may be a particle size distribution for the plurality of electrically conductive particles 120 or for the at least 90% of the electrically conductive particles in the plurality of electrically conductive particles 120.

In some embodiments, for the plurality of particles 120 or for the at least 90% of the plurality of particles 120, the particle diameters D10, D50, and/or D90 are as follows. In some embodiments, D50 is in a range of about 0.3 to about 0.6 times the distance T. In some such embodiments or in other embodiments, D90 is in a range of about 0.5 to about 1 times T or to about 0.9 times T. In some such embodiments or in other embodiments, D10 is in a range of about 0.2 to about 0.5 times T.

In some embodiments, for the at least 90% of the electrically conductive particles in the plurality of electrically conductive particles 120, the electrically conductive particles have a particle diameter D10≥T/10, or D10≥T/8, or D10≥T/6, or D10≥T/5, or D10≥T/4. In some embodiments, the plurality of electrically conductive particles 120 has a particle diameter D10≥T/10, or D10≥T/8, or D10≥T/6, or D10≥T/5, or D10≥T/4. D10 values in these ranges have been found to provide improved electrical conductance compared to films with smaller D10 values. For example, adding small electrically conductive particles (e.g., smaller than T/20) to an adhesive layer including particles having a D50 value greater than T/4 or greater than T/3, for example, can reduce the D10 value of the conductive particles and this has been found to increase the electrical resistance of the film. Thus, in some embodiments, a larger D10 (e.g., D10≥T/10) is preferred. In some embodiments, for the at least 90% of the electrically conductive particles in the plurality of electrically conductive particles 120, the electrically conductive particles have a particle diameter D10≥T/5, a particle diameter D50≥T/3, and a particle diameter D90≤0.9 T. In some embodiments, the plurality of electrically conductive particles 120 has a particle diameter D10≥T/5, a particle diameter D50≥T/3, and a particle diameter D90≤0.9 T.

The spread of particle diameters in the particle size distribution may be quantified by the ratio D90/D10 and/or by a coefficient of variation of the distribution of particle sizes. In some embodiments, larger D10 values are preferred (e.g., D10≥T/10 or other ranges described elsewhere) while D90 values less than T or less than 0.9 T are preferred. Accordingly, in some embodiments, it is desired that the particles 120 have a relatively narrow spread of particle diameters. In some embodiments, the particles 120 have a monomodal particle size distribution.

In some embodiments, for the at least 90% of the electrically conductive particles in the plurality of electrically conductive particles 120, the electrically conductive particles have particle diameters D10 and D90, where D90/D10 is less than about 4, or less than about 3.5, or less than about 3, or less than about 2.5, or less than about 2. In some embodiments, the plurality of electrically conductive particles 120 has particle diameters D10 and D90, where D90/D10 is less than about 4, or less than about 3.5, or less than about 3, or less than about 2.5, or less than about 2.

For the distribution 115, the particle diameters have a standard deviation σ, which can be understood to be the volume-weighted arithmetic standard deviation, unless indicated differently. The ratio of the standard deviation c to the mean particle diameter Dm times 100% is the coefficient of variation. In some embodiments, the plurality of electrically conductive particles 120 has a particle size distribution having a coefficient of variation of less than about 25%, or less than about 23%, or less than about 21%, or less than about 20%, or less than about 16%, or less than about 14%, or less than about 13%. In some embodiments, for the at least 90% of the electrically conductive particles in the plurality of electrically conductive particles 120, the electrically conductive particles has a particle size distribution having a coefficient of variation of less than about 25%, or less than about 23%, or less than about 21%, or less than about 20%, or less than about 16%, or less than about 14%, or less than about 13%.

The electrically conductive particles 120 can have any suitable shape. In some embodiments, each particle in at least a majority of the electrically conductive particles 120 is at least roughly spherical (e.g., as opposed to fiber or flake shapes). In other embodiments, the particles may have other shapes. In some embodiments, the shape of a particle can be described in terms of the sizes of concentric spheres where an outermost surface of the particle fits between the concentric spheres.

Figure 3:
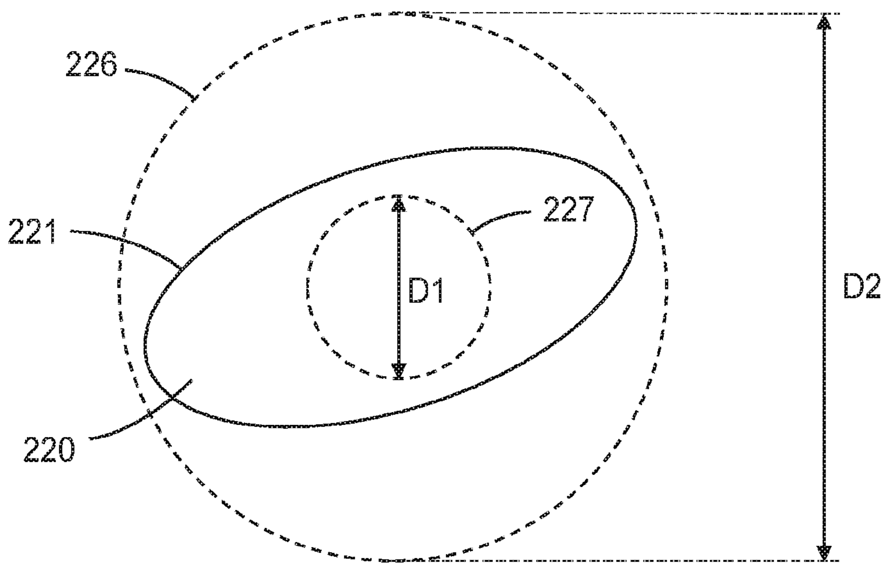
FIG. 3 is a schematic cross-sectional view of an illustrative particle disposed between concentric larger and smaller spheres.

In some embodiments, for each particle in at least a majority of the electrically conductive particles 120, an outermost surface of the particle fits between concentric larger and smaller spheres, where the larger sphere has a diameter of no more than about 5, or no more than about 4, or no more than about 3, or no more than about 2, or no more than about 1.5, or no more than about 1.2 times a diameter of the smaller sphere. This is schematically illustrated in FIG. 3 which schematically shows a particle 220 (e.g., corresponding to one of the particles 120), according to some embodiments, which has an outermost surface 221 that fits between concentric larger and smaller spheres 226 and 227 which have diameters of D2 and D1, respectively. For a particle having an outermost surface that fits between concentric larger and smaller spheres where the larger sphere 226 has a diameter D2 of no more than about 2 times a diameter D1 of the smaller sphere 227, the particle can be considered to be substantially spherical. In some embodiments, each particle in at least a majority of the electrically conductive particles is substantially spherical. The shapes of the outermost surface of the particles can be determined by inspection using an optical microscope, for example.

In some embodiments, an electrically conductive adhesive film 100 includes an adhesive layer 110 having opposing first and second major surfaces 112 and 114 spaced apart a distance T in a thickness direction of the layer where T≥20 microns, and includes a plurality of electrically conductive particles 120 dispersed in the adhesive layer 110 between the first and second major surfaces 112 and 114. In some embodiments, the plurality of electrically conductive particles 120 has particle diameters D10, D50 and D90, where D50 is greater than T/4, D90 less is than 0.9 T, and D90/D10 is less than 3.5. In some embodiments, the plurality of electrically conductive particles 120 has particle diameters D10 and D90, where D10 is greater than T/4 and D90 less is than 0.9 T. For each particle 220 in at least a majority of the electrically conductive particles 120, an outermost surface 221 of the particle 220 fits between concentric larger and smaller spheres 226 and 227, where the larger sphere 226 has a diameter D2 of no more than about 4 times a diameter D1 of the smaller sphere 227. D2/D1 can alternatively be no more than about 5, or no more than about 3, or no more than about 2, or no more than about 1.5, or no more than about 1.2, for example.

Any suitable type of electrically conductive particle can be used. For example, the electrically conductive particles may be carbon black particles, graphite particles, silver particles, copper particles, nickel particles, aluminum particles, or a combination thereof. In some embodiments, at least some of the particles include a nonconductive core (e.g., glass or polymer) coated with a conductive material (e.g., metal).

Figure 4:
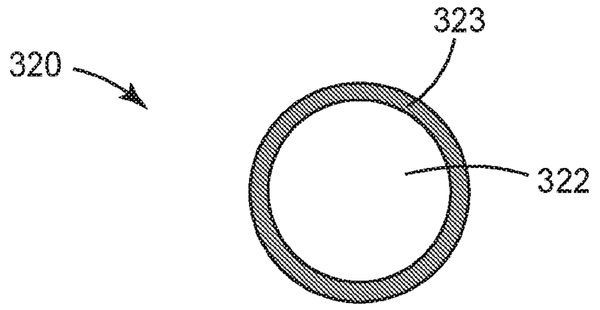
FIG. 4 is a schematic cross-sectional view of an illustrative electrically conductive particle.

FIG. 4 is a schematic cross-sectional view of a particle 320 which may correspond to a particle in the plurality of electrically conductive particles 120. Particle 320 includes a core 322 coated with an electrically conductive material 323. The core 322 can be a polymeric core, for example. The electrically conductive material 323 can be a metal, for example. In some embodiments, each particle in at least a majority of the electrically conductive particles 120 incudes a polymeric core 322 coated with a metal 323. The polymeric core 322 can be or include an acrylate or a methacrylate, for example. For example, the polymeric core can be a polymethylmethacrylate (PMMA) core. The metal 323 can be an elemental metal (e.g., nickel, copper, silver, or aluminum) or an alloy. For example, the metal 323 can be nickel.

In some embodiments, the at least a majority of the electrically conductive particles 120 for which the shape or type of conductive particle is specified and/or for which the structure of the particle (e.g., core with conductive coating) is specified includes at least 60%, or at least 70%, or at least 80% of the particles. A specified percent of the particles refers to percent by number, unless indicated differently (e.g., a majority of the particles is greater than 50% by number of the particles, unless indicated differently). In some embodiments, the at least a majority of the electrically conductive particles 120 for which the shape or type of conductive particle is specified and/or for which the structure of the particle (e.g., core with conductive coating) is specified provides at least 50%, or at least 60%, or at least 70%, or at least 80% of a total volume of the particles.

In some embodiments, the electrically conductive adhesive film 100 is electrically conductive in a thickness direction (z-direction) of the adhesive layer 110. In some embodiments, the electrically conductive adhesive film 100 is electrically conductive in a thickness direction of the adhesive layer 110 and in at least one direction (e.g., one or both of the x- and y-directions) orthogonal to the thickness direction. In some embodiments, the electrically conductive adhesive film 100 is electrically conductive in each of three mutually orthogonal directions (e.g., along each of the x-, y-, and z-directions). Techniques for measuring the electrical resistance in the thickness direction and/or in in-plane direction(s) are known in the art. Suitable techniques are described in U.S. Pat. Appl. Pub. No. 2009/0311502 (McCutcheon et al.), for example.

Figure 5:
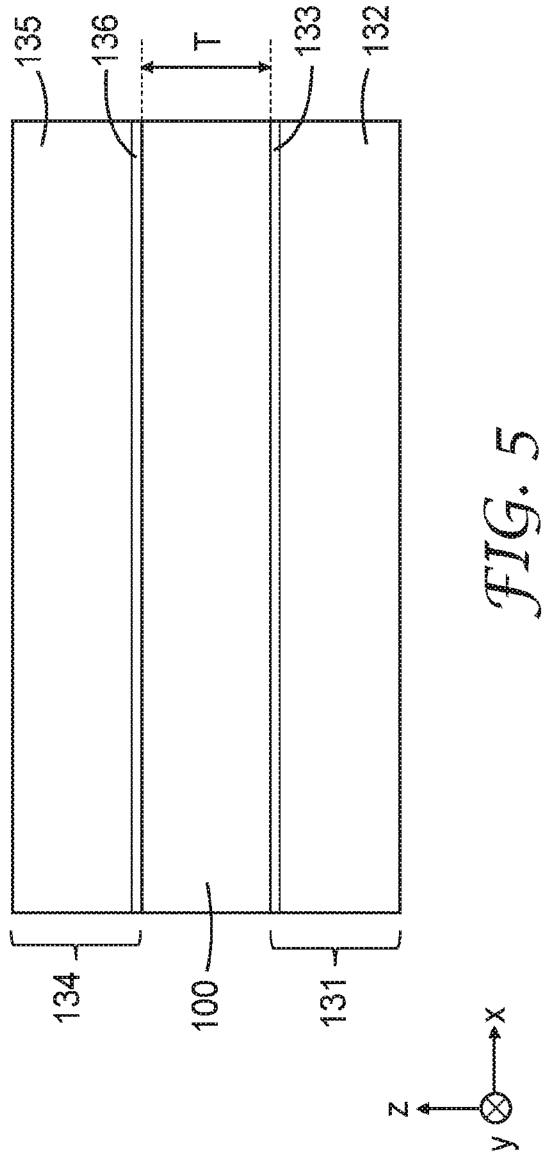
FIG. 5 is a schematic cross-sectional view of an illustrative electrically conductive adhesive film disposed between substrates.

In some embodiments, the electrically conductive adhesive film 100 has an electrical resistance R in the thickness direction (z-direction), where R/T≤2 ohm/mm, or R/T≤1 ohm/mm, or R/T≤0.7 ohm/mm, or R/T≤0.5 ohm/mm. The electrical resistance can be measured between any two suitable substrates. FIG. 5 is a schematic cross-sectional view of the electrically conductive adhesive film 100 disposed between substrates 131 and 134, according to some embodiments. The resistance of the electrically conductive adhesive film 100 can be measured in the z-direction between the substrates 131 and 134. The substrate can include a layer 133, 136 on a base layer 132, 135. For example, the layer 133 and/or 136 can be a gold plated layer and the corresponding base layer 132 and/or 135 can be a copper layer. As another example, one of the layers 133 and 136 can be an oxide layer or can alternatively be omitted and the corresponding base layer 132 or 135 can be a stainless steel layer. Any stainless steel layer or substrate described herein can be a 304 or 316 stainless steel according to the SAE International steel grades, for example. In some embodiments, the electrical resistance R is an electrical resistance of the electrically conductive adhesive film 100 measured between two gold plated copper plates 131 and 134, where each gold plated copper plate 131, 134 includes a gold layer 133, 136 facing the electrically conductive adhesive film 100. In some embodiments, the electrical resistance R is an electrical resistance of the electrically conductive adhesive film 100 measured between a gold plated copper plate 131 and a stainless steel plate 134 where the gold plated copper plate 131 includes a gold layer 133 facing the electrically conductive adhesive film 100.

Figure 6:
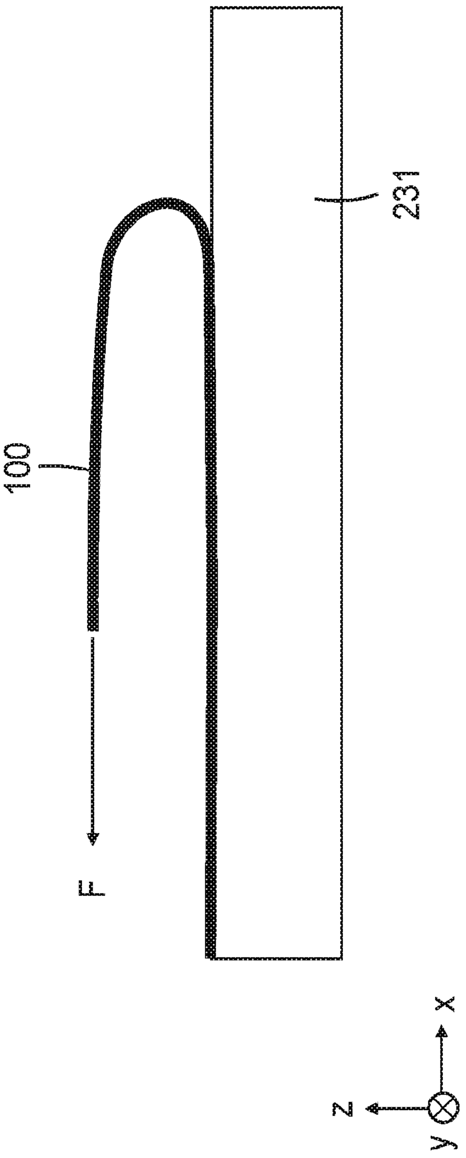
FIG. 6 is a schematic illustration of a 180 degree peel.

FIG. 6 is a schematic cross-sectional view illustrating peeling the electrically conductive adhesive film 100 from a substrate 231 with a 180 degree peel. In some embodiments, the electrically conductive adhesive film 100 has a 180 degree peel strength F of at least 100 N/m, or at least 150 N/m, or at least 200 N/m, or at least 250 N/m, or at least 300 N/m, or at least 350 N/m as measured by ASTM D1000-17 on stainless steel at a temperature of 25° C. The peel strength F is a force per unit width (dimension of film 100 along y-direction, referring to the illustrated x-y-z coordinate system).

In some embodiments, the electrically conductive adhesive film 100 simultaneously has a high peel strength (e.g., in any of the ranges described elsewhere herein) and a low resistance (e.g., in any of the ranges described elsewhere herein). For example, in some embodiments, the electrically conductive adhesive film 100 has a 180 degree peel strength of at least 100 N/mm as measured by ASTM D1000-17 on stainless steel at a temperature of 25° C., and the electrically conductive adhesive film 100 has an electrical resistance R in the thickness direction where R/T≤2 ohm/mm. As another example, in some embodiments, the electrically conductive adhesive film 100 has a 180 degree peel strength of at least 150 N/mm as measured by ASTM D1000-17 on stainless steel at a temperature of 25° C., and the electrically conductive adhesive film 100 has an electrical resistance R in the thickness direction where R/T≤1 ohm/mm. As yet another example, in some embodiments, the electrically conductive adhesive film 100 has a 180 degree peel strength of at least 200 N/mm as measured by ASTM D1000-17 on stainless steel at a temperature of 25° C., and the electrically conductive adhesive film 100 has an electrical resistance R in the thickness direction where R/T≤0.7 ohm/mm.

In some embodiments, the adhesive layer 110 includes a radiation cured (e.g., ultraviolet cured) polymer (e.g., a continuous phase of the adhesive layer 110 can be a radiation cured polymer) Radiation cured adhesive formulations have been found to allow thicker electrically conductive adhesive layers to be formed compared to conventional solvent cast adhesive layers, for example. In some embodiments, the adhesive layer 110 includes a crosslinked methacrylate, for example. The radiation cured polymer and/or the crosslinked methacrylate can have a glass transition temperature greater than about −10° C. or greater than about −5° C., for example. It has been found that such glass transition temperatures can result in improved initial adhesion. In some embodiments, the radiation cured polymer and/or the crosslinked methacrylate has a high degree of crosslinking which has been found to result in improved reliability or robustness of the adhesive layer and/or reduced cohesive failure of the layer. The degree of crosslinking can be characterized by the stress relaxation ratio of the adhesive layer 110. The stress relaxation ratio is the ratio of the shear modulus G determined 300 seconds after applying an initial shear stress to the adhesive layer to the shear modulus G determined 0.1 seconds after applying the initial shear stress to the adhesive layer. In some embodiments, the stress relaxation ratio is at least about 0.1 or at least about 0.15, or at least about 0.2, or at least about 0.25. In some embodiments, the stress relaxation ratio is in a range of about 0.15 to about 0.5 or about 0.2 to about 0.4. In some embodiments, the adhesive layer 110 has a glass transition temperature greater than about −10° C. and a stress relaxation ratio of at least about 0.2. In some embodiments, the adhesive layer 110 has a glass transition temperature greater than about −5° C. and a stress relaxation ratio of at least about 0.25. The glass transition temperature and stress relaxation ratio can be adjusted by suitable selection of monomers and crosslinking agent(s) and concentration of the crosslinking agent(s), for example. The glass transition temperature and the stress relaxation ratio of the adhesive layer can be determined using dynamic mechanical analysis techniques, as known in the art. The glass transition temperature can be determined according to the ASTM E1640-18 test standard, for example.

In some embodiments, the particles 120 are distributed in the adhesive layer in a pattern. Methods of patterning a distribution of particles in an adhesive layer are described in U.S. Pat. No. 8,975,004 (Choi et al.) and U.S. Pat. No. 9,336,923 (Choi et al.). In brief summary, when a resin including particles dispersed in monomers or oligomers is cured, the particles tend to migrate away from where polymerization is initiated. Curing through a patterned release liner can therefore result in a higher concentration of particles in regions that were masked out by the patterned release liner and a lower concentration in regions that were not masked. Here, concentration can be understood to be the number of particles per unit area in a plan view (from the top or the bottom) of the layer. Further, the particles in the non-masked regions tend to be concentrated away from the major surfaces since polymerization can be initiated from both sides (e.g., the layer can be irradiated from both sides), while particles in the masked region can provide electrically conductive paths between the opposing major surfaces of the layer. It has been found that patterning a distribution of particles in an adhesive layer can result in improved conductivity in the thickness direction of the layer due to the higher concentration regions and improved adhesion due to the lower concentration regions. Further, in embodiments where large particles are included (e.g., D50 greater than T/4), it has been found that the improvement in conductivity and adhesion is greater when the regions of higher concentration are discrete spaced apart regions (e.g., compared to a continuous grid having the higher concentration).

Figure 7A:
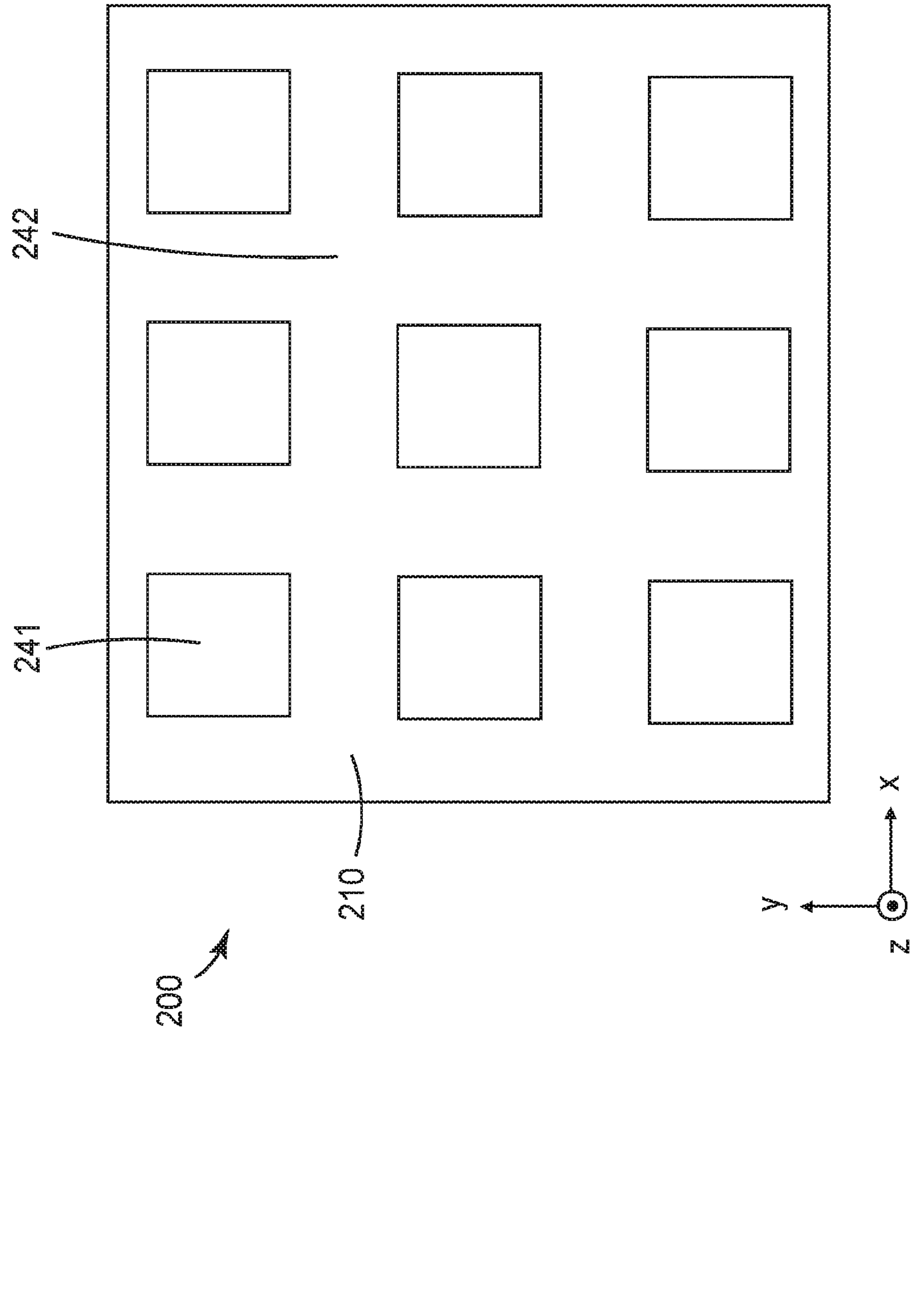
FIGS. 7A-7B are schematic top plan and side cut-away views, respectively, of an illustrative electrically conductive adhesive film.
Figure 7B:
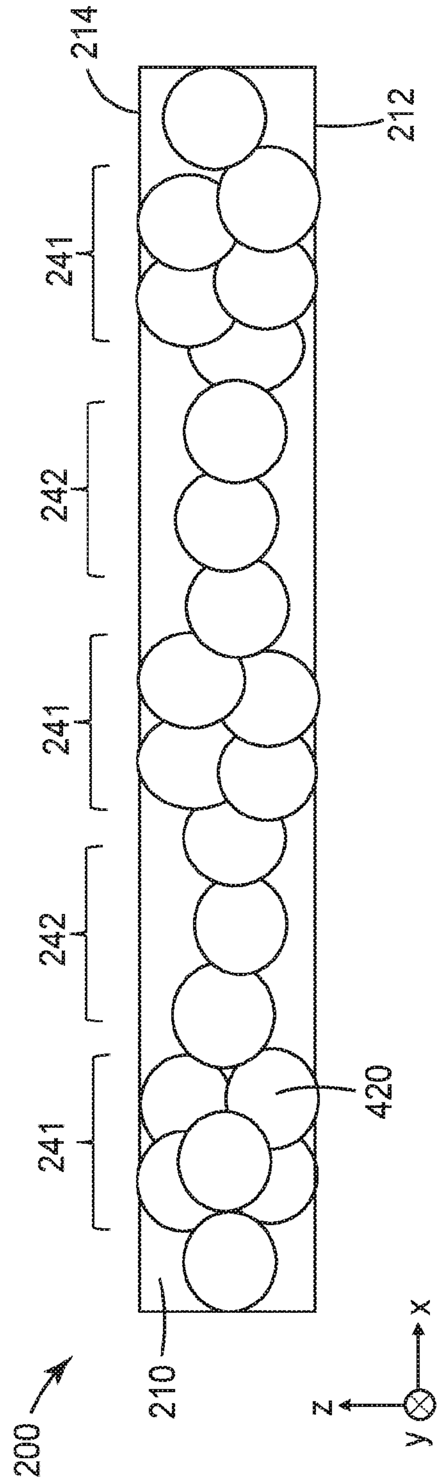

FIGS. 7A-7B are schematic top plan and side cut-away views, respectively, of an illustrative electrically conductive adhesive film 200 including an adhesive layer 210 and a plurality of electrically conductive particles 420 dispersed in the adhesive layer 210. The electrically conductive adhesive film 200 can correspond to the electrically conductive adhesive film 100, for example. In some embodiments, the electrically conductive adhesive film 200 is patterned such that at least one first region 241 of the electrically conductive adhesive film 200 has a higher concentration of the electrically conductive particles 420 (i.e., a higher number of particles per unit area in a plan view) and a least one second region 242 of the electrically conductive adhesive film 200 has a lower concentration of the electrically conductive particles 420 (i.e., a lower number of particles per unit area in the plan view). In some embodiments, the at least one first region 241 is or includes a regular array of discrete spaced apart first regions. In some embodiments, the at least one second region 242 is a single second region 242 surrounding each first region 241. Alternatively, in some embodiments, the at least one second region 242 can be considered to include a plurality of second regions where each second is adjacent to a first region or between adjacent first regions. In some embodiments, each first region 241 includes particles in the plurality of electrically conductive particles 420 arranged to provide an electrically conductive path between first and second major surfaces 212 and 214 of the adhesive layer 210. In some such embodiments, the at least one second region 242 includes particles in the plurality of electrically conductive particles 420 arranged to provide an electrically conductive path between adjacent first regions 241 without providing an electrically conductive path between the first and second major surfaces 212 and 214 of the adhesive layer 210. In some such embodiments, adjacent first regions 241 are electrically connected to one another only by virtue of the particles in the at least one second region 242.

EXAMPLES

All parts and percentages are by weight unless indicated differently.

TABLE 1

| Materials | | |
|---|---|---|
| Material | Description | Source |
| PCN100 | Nickel coated PMMA powder available under the tradename PCN-100 and having a nominal D50 of 100 microns | SNCTECH, Gwangju, Korea |
| PCN80 | Nickel coated PMMA powder available under the tradename PCN-80 and having a nominal D50 of 80 microns | SNCTECH, Gwangju, Korea |
| PCN30 | Nickel coated PMMA powder available under the tradename PCN-30 and having a nominal D50 of 30 microns | SNCTECH, Gwangju, Korea |
| PCN15 | Nickel coated PMMA powder available under the tradename PCN-15 and having a nominal D50 of 15 microns | SNCTECH, Gwangju, Korea |
| 2EHA | 2-Ethylhexyl acrylate | BASF, Germany |
| 2EHMA | 2-Ethylhexyl methacrylate | BASF, Germany |
| AA | Acrylic acid | BASF, Germany |
| DMAA | N-dimethylacrylamide | BASF, Germany |
| HDDA | 1,6-Hexanediol diacrylate | SK Cytec, Korea |
| IRG651 | 2,2-Dimethoxy-1,2-diphenylethan-1-one available under the tradename IRGACURE 651 | IGM Resins, China |

A pre-polymerized syrup was prepared by adding 0.04 pph of a photoinitiator (IRG651) into 100 parts by weight of acrylic monomer (2EHA) and conducting low intensity radiation polymerization until the temperature was raised by approximately 6 to 9° C. Slurry formulations were then prepared by mixing the pre-polymerized syrup, acrylates, crosslinker (HDDA), additional IRG651, and conductive powder at the parts by weight indicated in Table 2.

TABLE 2

| Formulation | Pre-polymerized syrup | DMAA | AA | 2EHMA | HDDA | IRG651 | Particle amount | Particle type |
|---|---|---|---|---|---|---|---|---|
| F1 | 70 | 30 | | | 0.2 | 0.1 | 120 | PCN100 |
| F2 | 70 | 30 | | | 0.2 | 0.1 | 120 | PCN80 |
| F3 | 70 | 30 | | | 0.2 | 0.1 | 120 | PCN30 |
| F4 | 70 | 30 | | | 0.2 | 0.1 | 120 | PCN15 |
| F5 | 70 | 30 | | | 0.2 | 0.1 | 100 | PCN100 |
| F6 | 70 | 30 | | | 0.2 | 0.1 | 140 | PCN100 |

TABLE 2-continued

| Formulation | Pre-polymerized syrup | DMAA | AA | 2EHMA | HDDA | IRG651 | Particle amount | Particle type |
|---|---|---|---|---|---|---|---|---|
| F7 | 88 | | 10 | 2 | 0.1 | 0.1 | 120 | PCN100 |
| F8 | 70 | 30 | | | 0.1 | 0.1 | 120 | PCN100 |
| F9 | 92 | | 8 | | 0.2 | 0.1 | 120 | PCN100 |
| F10 | 92 | | 8 | | 0.1 | 0.1 | 120 | PCN100 |

Each of the slurry formulations was coated between two patterned polyethylene terephthalate support films by using dual rollers at a coating speed of 2 m/min, and UV curing with total energy density controlled between 2916 mJ/cm2 and 4248 mJ/cm2. Coating thickness was controlled to be 0.20 mm. The support films were release films treated with fluorosilicone. The release films were patterned for photo-masking as generally described in described in U.S. Pat. No. 8,975,004 (Choi et al.) and U.S. Pat. No. 9,336,923 (Choi et al.) except that the mask pattern was as generally shown in FIG. 7A with 0.25 mm wide squares and with a gap between adjacent squares of 0.25 mm.

Z-axis electrical resistance was measured for various samples as generally described in U.S. Pat. Appl. Pub. No. 2009/0311502 (McCutcheon et al.) between gold (on gold plated copper) and stainless steel and between two gold layers (each layer being a gold plated layer on a copper substrate). 180 degree peel strength was measured for various samples according to ASTM D1000-17 on stainless steel at a temperature of 25° C. Results are provided in Tables 3-4.

TABLE 3

| Example | Form. | Nominal D50 of Conductive Powder (μm) | Thickness/ Nominal D50 | Powder content (wt %) | Electrical resistance (Z-Axis) Ω (Gold/Stainless steel) | Electrical resistance (Z-Axis) Ω (Gold/Gold) |
|---|---|---|---|---|---|---|
| 1 | F1 | 100 | 2 | 54.4 | 0.055 | 0.037 |
| 2 | F2 | 80 | 2.5 | 54.4 | 0.109 | 0.051 |
| Comp. Ex. CE1 | F3 | 30 | 6.67 | 54.4 | 0.455 | 0.209 |
| Comp. Ex. CE2 | F4 | 15 | 13.3 | 54.4 | X | X |
| 3 | F5 | 100 | 2 | 49.9 | 0.074 | 0.0485 |
| 4 | F6 | 100 | 2 | 58.2 | 0.082 | 0.0515 |

X = above upper measurable limit

TABLE 4

| Example | Form. | Tg (° C.) | 180 degree peel adhesion force, top side (gf/25.4 mm) | 180 degree peel adhesion force, bottom side (gf/25.4 mm) | Electrical resistance (Z-Axis) Ω (Gold/Stainless steel) | Electrical resistance (Z-Axis) Ω (Gold/Gold) |
|---|---|---|---|---|---|---|
| 1 | F1 | −2 | 2070 | 970 | 0.055 | 0.037 |
| 5 | F7 | −3 | 1915 | 1170 | 0.045 | 0.022 |
| 6 | F8 | 1.5 | 3205* | 2430 | 0.112 | 0.042 |
| 7 | F9 | −15 | 770 | 440 | 0.068 | 0.033 |
| 8 | F10 | −25 | 500 | 490 | 0.041 | 0.017 |

*Cohesive bonding failure

The z-axis electrical resistance for Examples 1 and 5 were measured after aging for 72 hours at 85 C and 85% humidity between gold plated copper and stainless steel and found to be about 3 ohms and about 0.3 ohms, respectively.

The glass transition temperature (Tg) and the stress relaxation ratio were measured using dynamic mechanical analysis on an ARES G2, TA Instruments, USA. Results are provided in Table 5.

TABLE 5

| Example | Monomer system | Monomer ratio | Tg (° C.) | HDDA (PPH) | Stress relaxation ratio |
|---|---|---|---|---|---|
| 1 | 2EHA/DMAA | 70:30 | −2 | 0.20 | 0.21 |
| 5 | 2EHA/AA/2EHMA | 92:08:02 | −3 | 0.10 | 0.32 |
| 6 | 2EHA/DMAA | 70:30 | 1.5 | 0.10 | 0.17 |
| 7 | 2EHA/AA | 92:08 | −15 | 0.20 | 0.46 |
| 8 | 2EHA/AA | 92:08 | −25 | 0.10 | 0.32 |

Examples 9-10 were prepared as described for Example 5, but the particles were sieved to remove the largest particles prior to mixing the particles with the monomers. The particle size distribution was determined using an LS 13 320 laser Diffraction Particle Size Analyzer (available from Beckman Coulter, Inc., Brea CA). Properties of the particle size distributions are provided in Table 6.

TABLE 6

| Example | D10 (μm) | D50 (μm) | D90 (μm) | Maximum Size (μm) | Coefficient of Variation (%) |
|---|---|---|---|---|---|
| 5 | 64.5 | 85.1 | 110.2 | 213.2 | 24.5 |
| 9 | 66.4 | 86.6 | 112 | 174.3 | 20.5 |
| 10 | 80.8 | 95.8 | 113.7 | 121.8 | 12.6 |

The electrical resistance and the peel strength were measured and are reported in Table 7.

TABLE 7

| Example | 180 degree peel adhesion force, top side (gf/25.4 mm) | 180 degree peel adhesion force, bottom side (gf/25.4 mm) | Electrical resistance (Z-Axis) Ω (Gold/Stainless steel) |
|---|---|---|---|
| 5 | 1915 | 1170 | 0.045 |
| 9 | 1895 | 1420 | 0.026 |
| 10 | 1225 | 1195 | 0.035 |

A sample was prepared from Example 9 by adding an additional 10 pph of nickel coated PMMA particles having a nominal median diameter of 5 microns. The electrical resistance of this sample in the thickness direction between gold and stainless steel layers was 0.18 ohms. Comparing this sample to Example 9 it can be seen that eliminating the particles (5 micron particles) having a size small compared to the thickness (200 microns) of the adhesive layer results in a reduced electrical resistance.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An electrically conductive adhesive film comprising:

an adhesive layer comprising opposing first and second major surfaces spaced apart a distance T in a thickness direction of the adhesive layer, T≥20 microns; and a plurality of electrically conductive particles dispersed in the adhesive layer between the first and second major surfaces, wherein for at least 90% of the electrically conductive particles in the plurality of electrically conductive particles, the electrically conductive particles have a particle diameter D50 greater than T/4 and a maximum size of the electrically conductive particles is less than T, wherein the electrically conductive adhesive film is patterned such that at least one first region of the electrically conductive adhesive film comprises a higher concentration of the electrically conductive particles and a least one second region of the electrically conductive adhesive film comprises a lower concentration of the electrically conductive particles, the at least one first region comprising a regular array of discrete spaced apart first regions, each first and second region comprising a plurality of the electrically conductive particles, the electrically conductive particles of each first region irregularly arranged in the first region to provide an electrically conductive path between the first and second major surfaces of the adhesive layer, the particles of each second region arranged to provide an electrically conductive path between adjacent first regions, wherein adjacent first regions are electrically connected to one another only by virtue of the electrically conductive particles in the at least one second region.

2. The electrically conductive adhesive film of claim 1, wherein each particle in at least a majority of the electrically conductive particles is substantially spherical.

3. The electrically conductive adhesive film of claim 1, wherein T≥50 microns.

4. The electrically conductive adhesive film of claim 1, wherein the particle diameter D50 is greater than T/3.

5. The electrically conductive adhesive film of claim 1, wherein the particle diameter D50 is less than 0.9 T.

6. The electrically conductive adhesive film of claim 1, wherein the maximum size is less than 0.9 T.

7. The electrically conductive adhesive film of claim 1, wherein the electrically conductive adhesive film has a 180 degree peel strength of at least 100 N/m as measured by ASTM D1000-17 on stainless steel at a temperature of 25° C.; and wherein the electrically conductive adhesive film has an electrical resistance R in the thickness direction, R/T≤2 ohm/mm.

8. The electrically conductive adhesive film of claim 1, wherein the plurality of electrically conductive particles has a particle size distribution having a coefficient of variation of less than about 25%.

9. The electrically conductive adhesive film of claim 1, wherein for the at least 90% of the electrically conductive particles in the plurality of electrically conductive particles, the electrically conductive particles have particle diameters D10 and D90, D90/D10 being less than about 4.

10. The electrically conductive adhesive film of claim 1, wherein for the at least 90% of the electrically conductive particles in the plurality of electrically conductive particles, the electrically conductive particles have a particle diameter D10≥T/10.

11. The electrically conductive adhesive film of claim 1, wherein each particle in at least a majority of the electrically conductive particles comprises a polymeric core coated with a metal.

12. The electrically conductive adhesive film of claim 11, wherein the polymeric core comprises polymethylmethacrylate.

13. The electrically conductive adhesive film of claim 1, wherein the adhesive layer comprises a crosslinked methacrylate.

14. The electrically conductive adhesive film of claim 1, wherein the at least one second region is a single second region surrounding each first region.

15. The electrically conductive adhesive film of claim 1, wherein the electrically conductive particles of the at least one second region does not provide an electrically conductive path between the first and second major surfaces.

16. The electrically conductive adhesive film of claim 1, wherein the adhesive layer has a glass transition temperature greater than about −10° C. and a stress relaxation ratio of at least about 0.2.

17. An electrically conductive adhesive film comprising:

an adhesive layer comprising opposing first and second major surfaces spaced apart a distance T in a thickness direction of the adhesive layer, T≥20 microns; and a plurality of electrically conductive particles dispersed in the adhesive layer between the first and second major surfaces and having particle diameters D10, D50 and D90, D50 greater than T/4, D90 less than 0.9 T, D90/D10 less than 3.5, wherein for each particle in at least a majority of the electrically conductive particles, an outermost surface of the particle fits between concentric larger and smaller spheres, the larger sphere having a diameter of no more than about 4 times a diameter of the smaller sphere, wherein the electrically conductive adhesive film is patterned such that at least one first region of the electrically conductive adhesive film comprises a higher concentration of the electrically conductive particles and a least one second region of the electrically conductive adhesive film comprises a lower concentration of the electrically conductive particles, the at least one first region comprising a regular array of discrete spaced apart first regions, each first and second region comprising a plurality of the electrically conductive particles, the electrically conductive particles of each first region irregularly arranged in the first region to provide an electrically conductive path between the first and second major surfaces of the adhesive layer, the particles of each second region arranged to provide an electrically conductive path between adjacent first regions, wherein adjacent first regions are electrically connected to one another only by virtue of the electrically conductive particles in the at least one second region.

18. The electrically conductive adhesive film of claim 17, wherein the at least one second region is a single second region surrounding each first region.

19. The electrically conductive adhesive film of claim 17, wherein the electrically conductive particles of the at least one second region does not provide an electrically conductive path between the first and second major surfaces.

* * * * *